O. K. SLETTO.
SHOCK AND HAY LOADER.
APPLICATION FILED JULY 28, 1910.
1,035,485.
Patented Aug. 13, 1912.
3 SHEETS—SHEET 1.
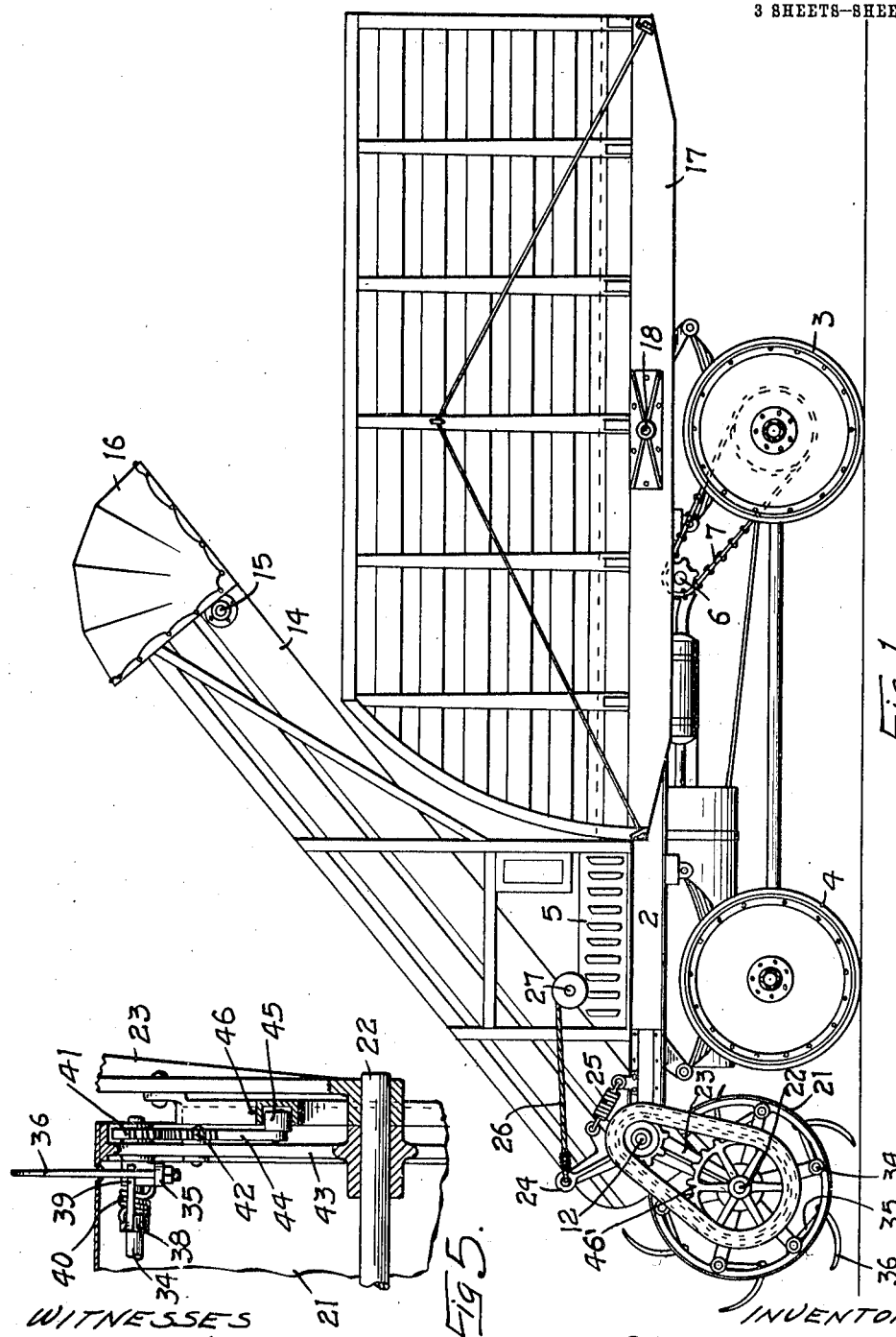

O. K. SLETTO.
SHOCK AND HAY LOADER.
APPLICATION FILED JULY 28, 1910.
1,035,485.
Patented Aug. 13, 1912.
3 SHEETS—SHEET 2.
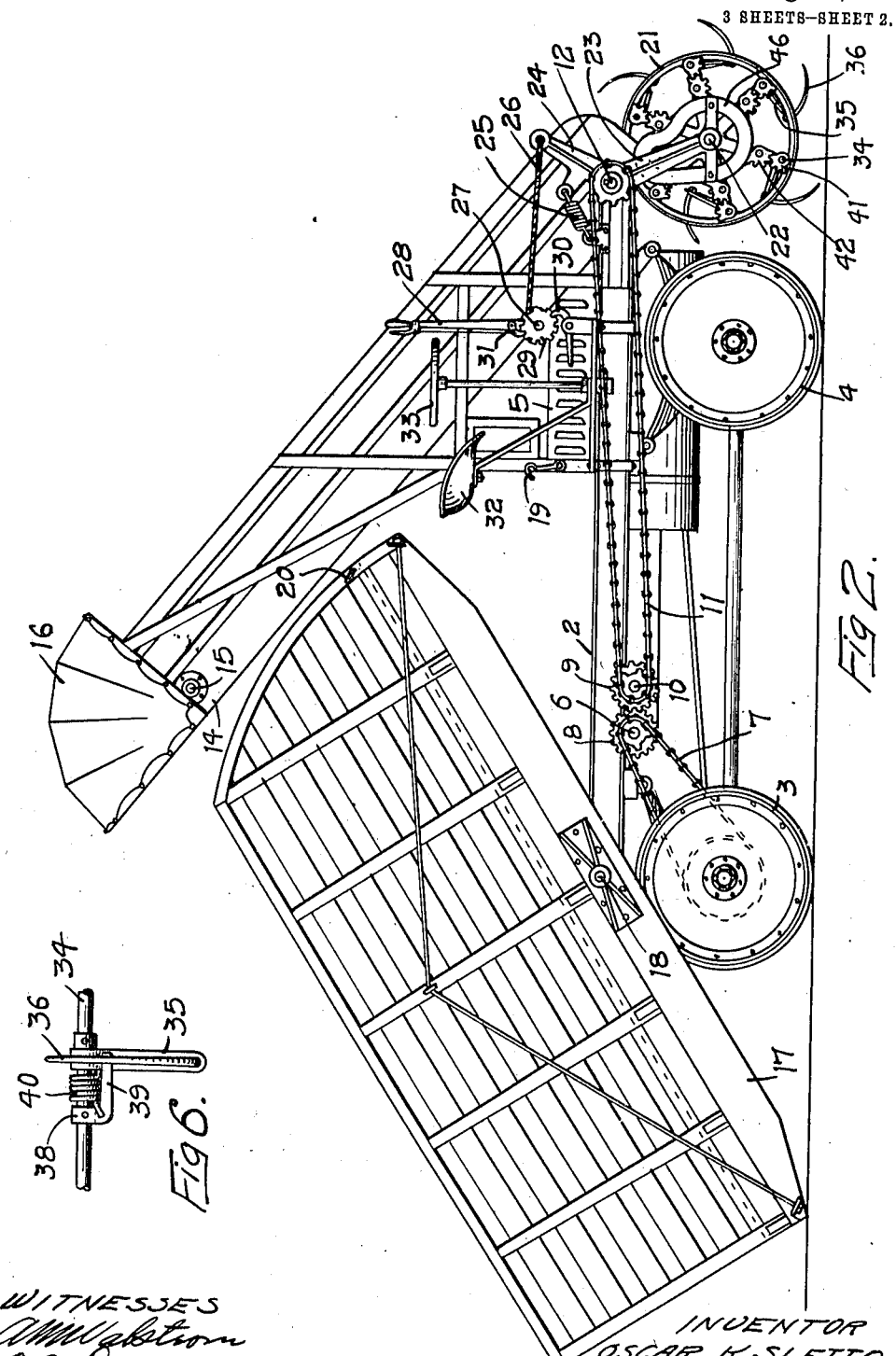

O. K. SLETTO.
SHOCK AND HAY LOADER.
APPLICATION FILED JULY 28, 1910.
1,035,485.
Patented Aug. 13, 1912.
3 SHEETS—SHEET 3.
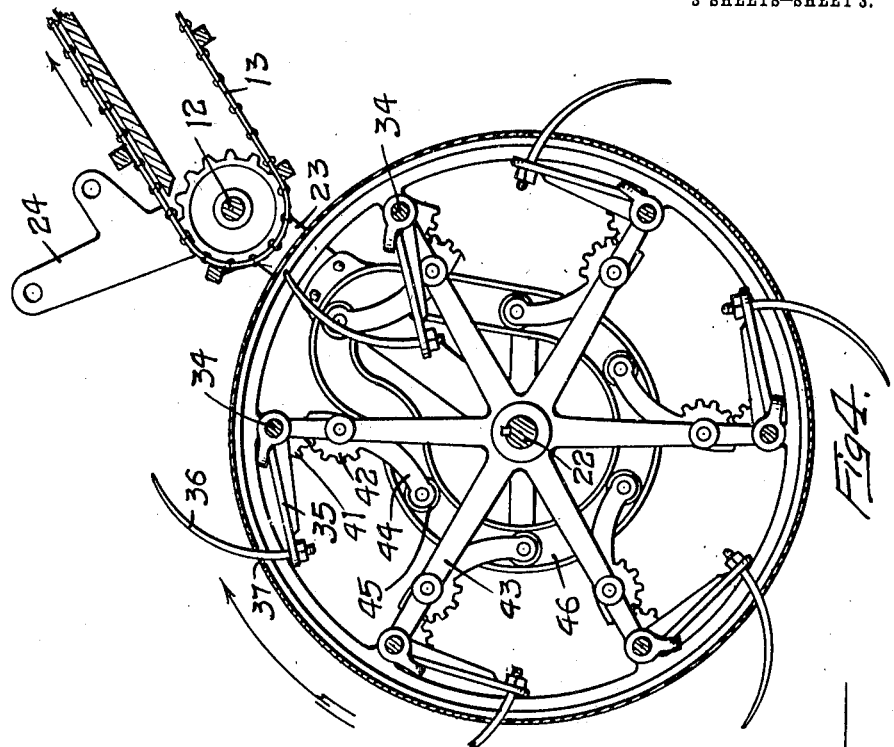
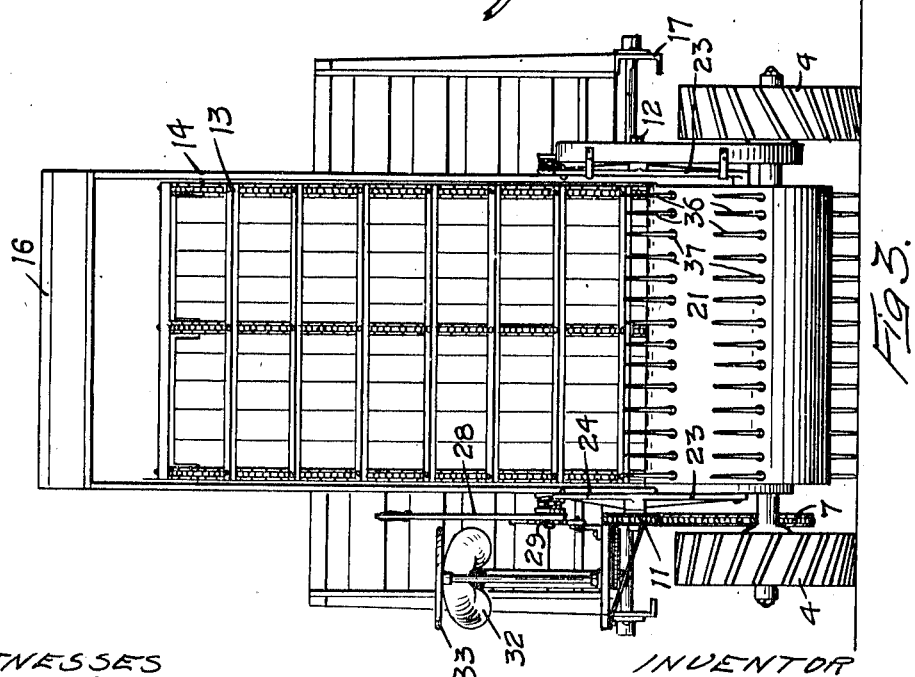
WITNESSES
INVENTOR
OSCAR K. SLETTO
BY
ATTORNEYS

UNITED STATES PATENT OFFICE.

OSCAR K. SLETTO, OF BEND, OREGON, ASSIGNOR OF ONE-THIRD TO PETER SPILMAN AND ONE-THIRD TO RICHARD KING, BOTH OF BEND, OREGON.

SHOCK AND HAY LOADER.

1,035,485.  Specification of Letters Patent.  Patented Aug. 13, 1912.

Application filed July 28, 1910. Serial No. 574,393.

*To all whom it may concern:*

Be it known that I, OSCAR K. SLETTO, of Bend, Crook county, Oregon, have invented certain new and useful Improvements in Shock and Hay Loaders, of which the following is a specification.

The object of my invention is to provide a loading apparatus designed for use with an automobile chassis.

A further object is to provide a machine of compact construction by means of which the bundles or shocks or, if desired, loose grain or hay, can be gathered up and deposited in a suitable receptacle.

The invention consists generally in an improved pick-up mechanism comprising a revolving drum and a series of pick-up fingers mounted therein, with means for alternately projecting said fingers beyond the periphery of the drum and withdrawing them within the periphery of the drum.

Further the invention consists in various details of construction for effecting the desired movement of the pick-up fingers, all as hereinafter described and particularly pointed out in the claims.

In the accompanying drawings forming part of this specification, Figure 1 is a side elevation of a shock and hay loader embodying my invention, Fig. 2 is a similar view of the opposite side of the machine, showing the rack in its dumping position, Fig. 3 is a front elevation, Fig. 4 is a transverse, sectional view through the pick-up frame, Fig. 5 is a detail sectional view illustrating the manner of mounting the pick-up fingers in the drum, Fig. 6 is a similar view, illustrating the stop device used in connection with the spring which actuates the pick-up fingers.

In the drawing, 2 represents a frame having carrying wheels 3 and 4 and a source of motive power consisting, preferably, in this case of a gas engine mounted on the forward portion of the frame under a hood 5 and having a driving connection with a shaft 6 from which the rear axle is driven from a sprocket chain 7 in the usual way. A gear 8 is mounted on the shaft 6 and meshes with a gear 9 on a shaft 10, from which a driving belt 11 extends forwardly to a shaft 12 which supports the lower portion of the elevating belt or apron 13 that is arranged within an inclined frame 14 at the upper end of which a shaft 15 supports the upper portion of the carrier or apron and an overhanging hood 16. A rack or receptacle 17 is pivotally supported at 18 above the rear axle and is capable of tilting rearwardly to discharge its load. The elevating apron overhangs the forward portion of the rack, so that the bundles or loose material brought up by the elevator will be discharged into the rack, the operation being continued until the rack is filled. The rack is held against premature tilting by a hook 19 which engages the loop 20 on the rack and holds it in its normally horizontal position.

In front of the frame is a drum 21, mounted on a shaft 22 that is journaled in hangers 23 which are carried by the shaft 12. Arms 24 are mounted on the hangers 23 and project upwardly above the shaft 12 and springs 25 are attached to said arms and to the frame of the machine and yieldingly support the drum, allowing it to swing back and forth, toward or from the ground line. A cable 26 is attached to the arms 24 and extends back to a shaft 27, the movement of which is controlled by a lever 28 and a gear 29 mounted on said shaft and a dog 30, which engages the teeth of the gear. The lever 28 has a locking latch 31 and the lever being loose on the shaft, can be moved back and forth to rock the shaft and wind up the cable thereon or release the shaft to allow the cable to unwind and the drum to drop. The operator's seat 32 is provided near the lever 28 and also the steering wheel 33 of the machine.

The pick-up device which forms the essential feature of my invention includes the drum 21, heretofore referred to, and a series of shafts 34 extending lengthwise within the drum from end to end and arranged a suitable distance apart around the periphery of the drum. Upon these shafts a series of arms 35 are loosely mounted, each carrying a curved pick-up finger 36 which projects through an opening 37 in the wall of the drum. A collar 38 is secured on the shaft 34 contiguous to each arm 35 and has a finger 39 projecting over the arm 35. A spring 40 is coiled around the shaft 34 and is attached at one end to the collar 38 and at its other end to the arm 35. This construction allows each finger to swing within the periphery of the drum independently of all the other fingers, and when a shaft is rocked in its bearings, all the fingers supported on that shaft will be retracted within the periphery of the drum simultaneously through the engagement of the fingers 39 with the arms.

For the purpose of rocking the shafts to withdraw or project the pick-up fingers, I provide gear segments 41 secured to the shafts and meshing with similar segments 42 which are pivoted on spiders 43 provided at the ends of the drum. The gear segments 42 have arms 44 thereon supporting anti-friction wheels 45 which travel in a cam track 46 as the drum revolves, said track being so arranged that the pick-up fingers will be projected at the proper moment to pick up a bundle of loose grain or hay from the ground and will be retracted within the drum just before the fingers reach the elevating belt to which the bundles, or loose grain or hay, are delivered. The pick-up fingers are also capable of independent projection or retraction, so that on uneven ground or in case of striking a stone or other obstruction, a finger may withdraw within the periphery of the drum until the obstruction is passed. The fingers will thus clear themselves with each revolution of the drum and will also automatically disengage themselves from any foreign material or obstruction which may be encountered by the drum in its revolution. The drum may be revolved at any suitable speed but is preferably operated through a driving connection with a sprocket 46' from the shaft 12.

The material having been gathered up may be conveyed rapidly to a distant point and then discharged by the tilting of the rack.

The machine being self contained in its power, can be moved rapidly from place to place and being composed of but few parts of simple construction can be easily mounted on the chassis of an automobile without any material modification in the driving connections or the location of the source of power.

In various ways the details of construction may be modified without departing from the spirit of my invention.

I claim as my invention:—

1. In a machine of the class described a wheeled frame, an elevator mounted thereon, a pick-up device comprising a revolving drum, a series of shafts journaled therein and extending from end to end thereof, gear segments secured on said shafts and having pick-up fingers arranged to project out of the periphery of said drum and capable of retraction within the periphery of said drum, pivoted gear segments arranged to mesh with said first named segments, arms carried by said second named gear segments, anti-friction rollers mounted on said arms and a cam track in which said anti-friction rollers travel, said track being adapted to operate said gear segments to rock said shafts and retract said pick-up fingers within the periphery of said drum at a predetermined point in its revolution.

2. In a machine of the class described a wheeled frame, an elevator mounted on said frame, a pick-up device comprising a revolving drum, a series of shafts journaled therein, gear segments secured to said shaft and having pick-up fingers projecting outside of the periphery of said drum and mounted to be retracted within the periphery of said drum, arms having teeth meshing with said gear segments, anti-friction rollers mounted on said arms, a cam track in which said anti-friction rollers travel, said cam track being adapted to operate said arms to rock said shafts and retract said pick-up fingers within the periphery of said drum at a predetermined point in its revolution.

3. The combination, with a wheeled frame and a source of motive power mounted thereon, of an elevator mounted on said frame and forwardly and downwardly inclined, a shaft at the lower end of said elevator having a driving connection with said source of motive power, hangers pivoted on said shaft and depending therefrom, a drum having bearings in said hangers, a series of pick-up fingers mounted in said drum and projecting through the periphery thereof, means for revolving said drum in the opposite direction from said carrying wheels, means for retracting said pick-up fingers within the periphery of said drum, and means for oscillating said hangers to raise and lower said drum.

4. The combination, with a frame having carrying wheels and a source of motive power mounted thereon and an elevator mounted on said frame, of a shaft journaled in the forward portion of said frame, hangers pivoted on said shaft and depending forwardly therefrom, a drum supported by said hangers and having a series of pick-up fingers, said drum revolving in a direction opposite to the direction of revolution of said wheels, means for revolving said drum, and means for oscillating said hangers to raise and lower said drum.

5. The combination, with a frame having carrying wheels and a source of motive power mounted on said frame and an elevator mounted on said frame, of a shaft journaled in the forward portion of said frame, hangers pivoted on said shaft, a drum carried by said hangers beneath the forward portion of said frame and in front of said carrying wheels, means for revolving said drum in a direction opposite to the direction of revolution of said wheels, arms mounted on said hangers, means connected with said arms for swinging said hangers and said drum upwardly, and springs connected with said arms and supporting said drum against downward movement with a yielding tension.

6. The combination, with a frame having carrying wheels and a source of motive power mounted thereon, of hangers pivotally supported in the forward portion of said frame and depending in front of said wheels, a drum carried by said hangers, a series of pick-up fingers mounted in said drum, means for revolving said drum in a direction opposite to the direction of revolution of said wheels, arms mounted on said hangers, springs connected with said arms and yieldingly resisting the downward swinging movement of said hangers and drum, and means for tilting said hangers upwardly to lift said pick-up fingers from the work.

In witness whereof, I have hereunto set my hand this 16th day of July 1910.

OSCAR K. SLETTO.

Witnesses:
  E. BERGLAND,
  RICHARD KING, Jr.